United States Patent [19]

Hareng et al.

[11] Patent Number: 4,525,708
[45] Date of Patent: Jun. 25, 1985

[54] THERMOELECTRIC EFFECT DISPLAY DEVICE

[75] Inventors: Michel Hareng; Robert Hehlen; Philippe Marcenac; Serge Le Berre; Pierre Leclerc; Jean-Noël Perbet, all of Paris, France

[73] Assignee: Thomson-CSF, Paris, France

[21] Appl. No.: 410,557

[22] Filed: Aug. 23, 1982

[30] Foreign Application Priority Data

Aug. 25, 1981 [FR] France .................. 81 16218

[51] Int. Cl.³ .............................................. G09G 3/36
[52] U.S. Cl. .................................. 340/713; 340/784; 350/350 S
[58] Field of Search ............... 350/350 S, 351, 333; 340/784, 713, 714

[56] References Cited

U.S. PATENT DOCUMENTS 3,637,291 1/1972 Kessler et al. ............... 350/351
4,137,551 1/1979 Rajchman .................... 340/781

FOREIGN PATENT DOCUMENTS 0023447 2/1981 European Pat. Off. .

OTHER PUBLICATIONS

IBM Technical Disclosure Bulletin, vol. 15, No. 6, Nov. 1972, by: J. V. Powers, "Thermally Activated Liquid Crystal Display", p. 1811.

Primary Examiner—Marshall M. Curtis
Attorney, Agent, or Firm—Oblon, Fisher, Spivak, McClelland & Maier

[57] ABSTRACT

The invention relates to display devices with a mixed thermal and electrical effect. The invention relates to a special addressing mode making it possible to display a writing line, while limiting the control voltages to be applied from the outside to the display screen.

4 Claims, 5 Drawing Figures

THERMOELECTRIC EFFECT DISPLAY DEVICE

BACKGROUND OF THE INVENTION

The present invention relates to display devices for characters in rows displayed from an electric control signal and more specifically display devices in which the inscribable material reacts optically with an electric field during a thermal cycle incorporating a heating phase and a cooling phase under field.

The invention more particularly applies to display devices having a matrix arrangement with a liquid crystal layer in the smectic phase.

A device of this type is described in French patent application 80 26544 entitled "Control device for a display screen and display screen controlled by this device", filed on Dec. 15th 1980, which was published on June 18, 1982 under the U.S. Pat. No. 2, 496,309. (The corresponding U.S. patent issued from U.S. Ser. No. 328,497 filed Dec. 8, 1981 as U.S. Pat. No. 4,427,997.) The proposed device makes it possible to considerably reduce the number of electronic external control systems by multiplexing the control channels, whilst retaining a high definition for the display screen.

The aforementioned patent application describes a matrix control display device comprising a layer of material which can be inscribed by a mixed thermal and electrical effect. According to this application, two crossed networks of conductors define a matrix arrangement of display points. One of the networks consists of heating elements for temporarily raising the temperature of the inscribable material layer. The other network cooperates with the first network for locally exposing the layer to electric control fields. The system arranges the N lines of a screen into $\sqrt{N}$ groups of lines supplied at each of their ends by $\sqrt{N}$ control devices functioning sequentially, as shown in FIG. 3 of the above-noted U.S. Pat. No. 4,427,997. Such an arrangement leads to a minimum number of electronic heating systems but from the standpoint of the interconnections to be provided it is necessary to have a relatively large number of insulated crossings. Moreover, the length of the heating strips can lead to significant voltage drops, which is not really suitable for a control by low voltage electronic components.

BRIEF SUMMARY OF THE INVENTION

To obviate these disadvantages, the present invention proposes a special addressing mode making it possible to display a writing line by limiting the control voltages to be applied from the outside of the screen of the display means.

It would initially appear to be a disadvantage to choose to heat the most numerous elements of the system of crossed conductors. However, it can be advantageous to substitute a control electronics comprising a small number of circuits having transistors operating under high voltages by a control electronics comprising a large number of circuits, but whose transistors operate under a low voltage. Another disadvantage is that the data access time is longer, but this is relatively unimportant in the case of screens where the inscribed data are semi-permanent and where it is unnecessary to refresh the information.

Therefore, the present invention specifically relates to a display device for displaying at least one writing line consisting of characters in response to an incident electric signal, comprising a layer of material which can be inscribed by thermoelectric phase transformation, two crossed systems of electrodes each surrounding the said layer and electric control means reacting to the content of the incident electric signal, so as to successively heat the electrodes of one of the said systems and to apply to the strips of said layer in the cooling phase an electric field for counteracting the induced diffusion effect, said control means being multiplexed in such a way as to switch over the heating currents with a small number of switching elements, as a result of unidirectional conduction elements placed in series with each electrode of the heating system, wherein the electrodes traversed by the heating currents are shorter and more numerous than the electrodes on the opposite face of said layer.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Hereinafter, it must be ensured that there is no confusion between the two multiplexing levels adopted for the display. A first multiplexing level relates to the matrix arrangement of two systems of electrodes extending on either side of the liquid crystal layer. One of these systems is used for the strip-by-strip heating of the liquid crystal layer, whilst the other is used for applying a group of electric voltages to the cooling strip for effecting the inscription of diffusing points. The heating control represents a second multiplexing level based on the subdivision into two groups of switching means connected to the two ends of each heating electrode.

Figure 1:
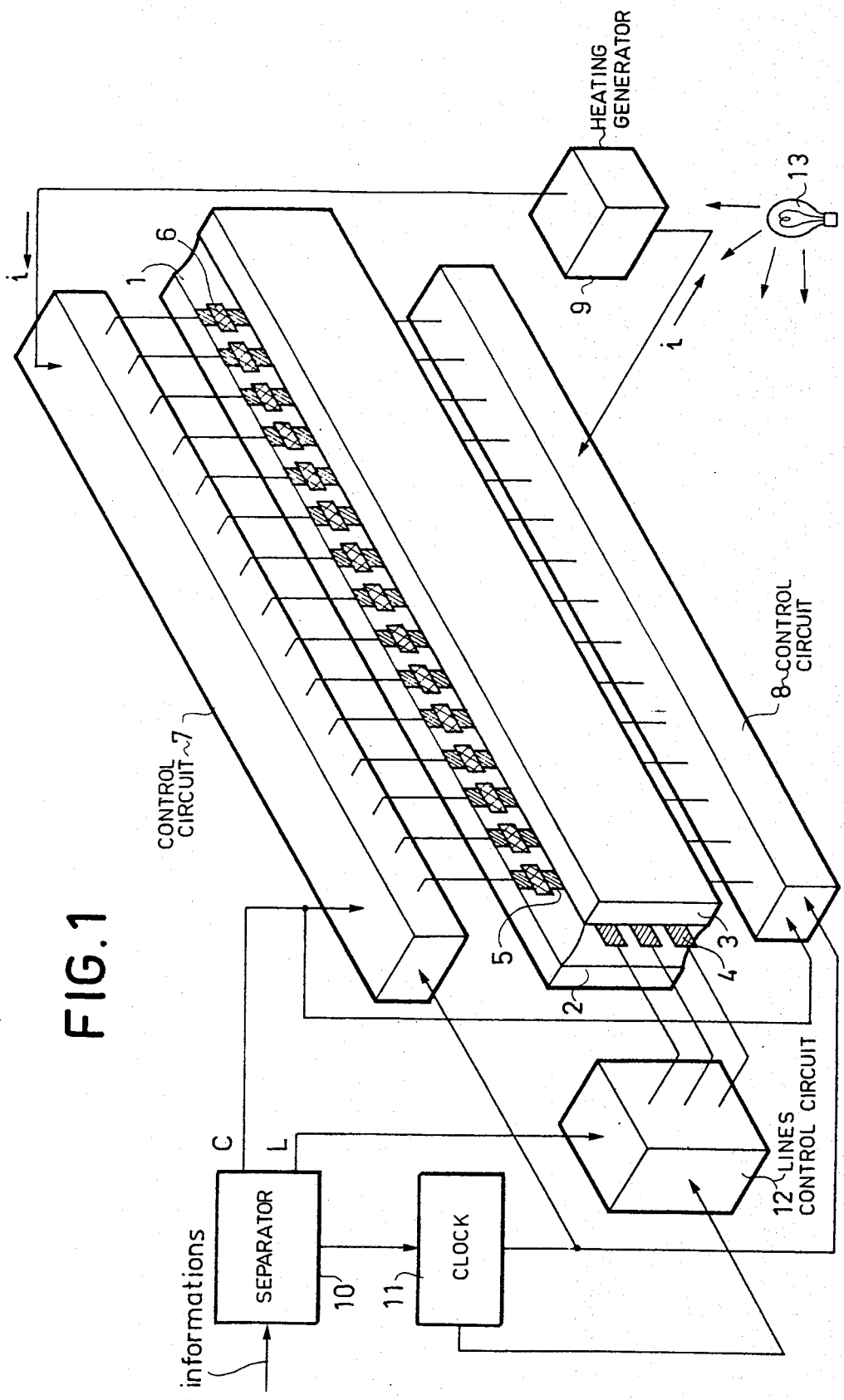
FIG. 1 is a block diagram of a general arrangement of the display device according to the invention.

As a non-limitative embodiment, FIG. 1 shows a display device according to the invention, whose screen comprises a number of elementary display cells voluntarily limited in order to make it easier to understand the operation of the device. This screen comprises elementary display cells defined by two systems of crossed conductors, namely a first system formed by three row connections and a second system formed by 15 column connections. The column connections, which are the shorter and more numerous elements, have been chosen to serve the function of the heating strips and are exposed to heating voltages supplied by the second multiplexing level.

Thus, FIG. 1 shows a display screen, whose inscribable material layer 1 is formed by a smectic liquid crystal inserted between two parallel plates 2 and 3, e.g. of glass and whose spacing of about 10 microns is defined by not shown shims. Onto the inner faces of these plates are deposited systems of orthogonally intersecting electrodes. In the case of a screen operating in reflection, one possible solution involves having the row connections 4 transparent and the column connections 5 reflecting. Electrodes 4 can be made from tin or indium oxide or a mixture of these oxides. Electrodes 5 can be made from aluminium. The gap between each electrode 5 is sufficiently small compared with its width to ensure that the image reflected by the screen does not appear to be superimposed to a raster pattern.

A diode 6 is arranged in series with each heating strip or column connection 5 in order to make the conductors unidirectional. The construction of these diodes, or in more general terms non-linear resistance elements, is essentially dependent on the substrates used for the display screen. In the case of substrates of the monocrystalline silicon type used in screens having small-size elementary points, i.e. 20 to 100 microns, the diodes can be directly integrated into the semiconductor substrate or can be joined in accordance with hybrid circuit technology. In the case of substrates such as the glass used in direct vision screens of larger dimensions and having between 2 and 10 points per millimeter, the diodes are joined as hereinbefore or are produced by means of amorphous silicon.

The display device functions as follows. The incident electric signal representing the characters to be displayed is firstly received by a circuit 10, which separates the signals allocated to the rows from those allocated to the columns. The row signals are transmitted into a row control circuit 12 having a buffer memory. The column signals are subdivided between two control blocks 7 and 8 which, by the allocation of appropriate control voltages, permit the passage of a heating current i from a heating generator 9. A clock 11 coordinates the electric control signals by its action on circuits 7, 8 and 12, as a function of the operations performed by separator circuit 10. A source 13 supplies the screen with the incident light which it will modify as a function of the control signals fed to it.

Figure 2:
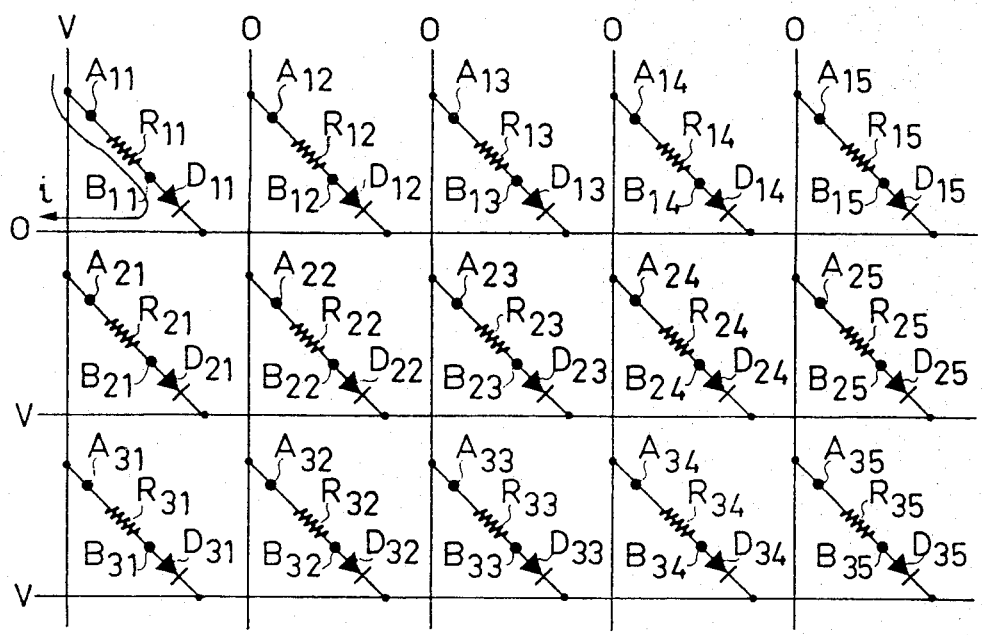
FIGS. 2 and 3 are schematic circuit diagrams illustrating the multiplexed thermal addressing according to the invention.
Figure 3:
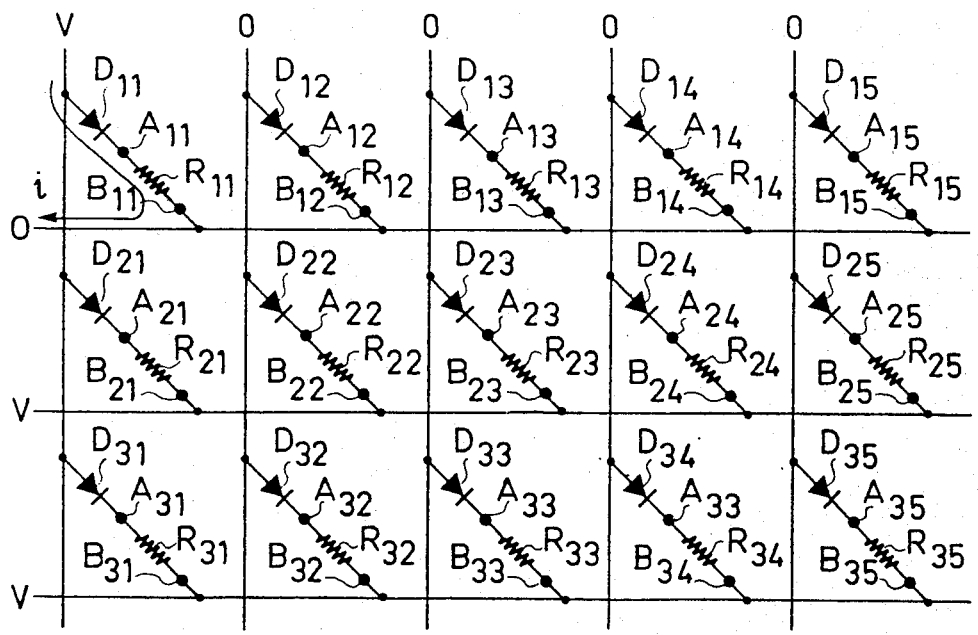

FIGS. 2 and 3 are diagrams explaining the multiplexed thermal addressing. As stated hereinbefore, the heating strips are traversed by heating currents supplied by P supply terminals of a first switching block 7 and Q supply terminals of a second switching block 8. The double heating control can be illustrated by a matrix arrangement of P rows and Q columns making it possible to address $N = P \cdot Q$ heating strips.

In FIGS. 2 and 3, the 15 heating strips of the screen described by FIG. 1 have been designated by terms such as Rij from $R_{11}$ to $R_{35}$. The difference between FIGS. 2 and 3 results from the location of the diodes upstream or downstream of the heating resistors. The references such as Aij and Bij designate the ends of each strip. Each heating strip Rij is arranged in series with a non-linear element in resistance element, e.g. a diode Dij and the system is exposed to potential Vij, which is the potential difference between column Qi and row Pj. In the case of such a number of heating strips, it is possible to arrange the multiplexing relative to the heating of these strips in two ways, i.e. three rows and 5 columns for the matrices in FIGS. 2 and 3, or 5 rows and 3 columns. Each diode Dij is identically installed following each heating resistor Rij. The function of the diode is to prevent the passage of the heating current into any heating strip other than the considered strip Rij. The heating matrix (P,Q) is exposed to two possible voltages namely 0 or +V (V being a positive voltage).

FIGS. 2 and 3 show in each case an operating example through the indication of voltages allocated to the different rows and columns of the heating matrix, as well as by the presence of the heating current traversing the heating strip $R_{11}$. Thus, as a result of this distribution of potentials Qi and Pj and through the presence of diodes Dij, only strip $R_{11}$ is traversed by the heating current. By means of a known multiplexing process defined by circuits 7 and 8, the heating strips are in turn traversed by the heating current i.

The location of the diodes is by no means unimportant. Thus, every possible effort must be taken not to unnecessarily lead potentials on the heating strip, because such potentials are highly prejudicial to the life of the liquid crystals.

FIG. 2 shows a first arrangement of the diodes. By choosing potentials Qi and Pj in the manner indicated in FIG. 2, it can be seen that $R_{11}$ is traversed by heating current i. In the case of this multiplexing system, only one of the columns, namely the first, is at potential V, whilst all the others are at potential 0. Conversely, the first row is at potential 0 and the diode $D_{11}$, which is correctly polarized permits the passage of the current i into $R_{11}$, whereas all the other rows are at potential V. All the diodes other than $D_{11}$ are blocked, the potential difference at their terminals is either 0 or $-V$. It should also be noted that $R_{21}$ and $R_{31}$ connected to the first column are at potential V, but no current passes through them.

FIG. 3 shows a second arrangement of the diodes. Potentials Qi and Pj are the same as for FIG. 2. In this case, only $R_{11}$ is traversed by current i, but potential V is now present on the heating strips connected to rows 2 and 3, or in the present case on 10 heating strips. The considerations provided hereinbefore naturally apply to the heating of all the strips of the display screen. The solution to be adopted is that which in connection with the control by electric field on average ensures the smallest potential difference between the faces of the liquid crystal layer.

It is pointed out that with this multiplexed heating strip system, the number of electronic devices making it possible to supply the heating voltages is $P+Q$ for $P \cdot Q$ strips. It is obviously advantageous to reduce the number of such devices to the greatest possible extent. This is brought about when $P = Q$. This solution requires that the number of heating strips is the square of a whole number, which cannot always be reconciled with the required screen.

Figure 4:
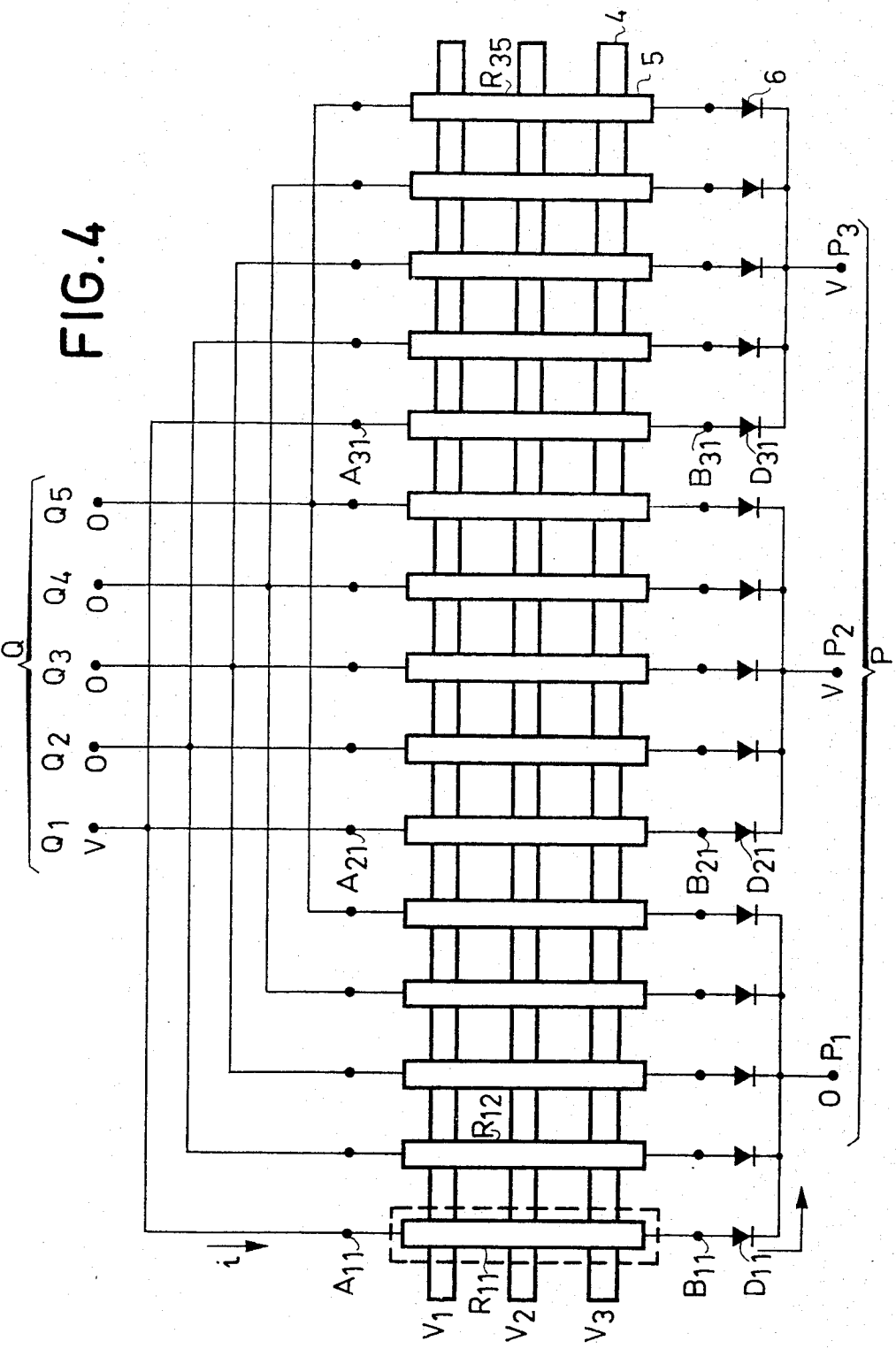
FIG. 4 is a schematic diagram of a display device according to the invention.

FIG. 4 is a circuit diagram of a display means according to the invention and, as stated hereinbefore, it comprises three rows 4 and 15 columns 5. The heating strips are characterized by their resistance Rij and their ends Aij and Bij. The distribution of the multiplexing voltages of the heating strips from control blocks 7 and 8 takes place by means of diodes 6, which are specified by the terms Dij. An example of the operation of the screen is given by the application of the voltages indicated in FIG. 4. The sequence of operations is as follows for exciting the cells of the screen corresponding to the first column. By choosing the same voltages as hereinbefore for heating the heating strips, the first column of resistance $R_{11}$ is traversed by heating current i and leads to the heating of the adjacent liquid crystal, which passes from the smectic phase into the isotropic phase. After redistribution of the multiplexing potentials relative to the heating, current i now tranverses strip $R_{12}$ and not strip $R_{11}$, the liquid crystal adjacent to the first column starts to cool and the row potentials $V_1$, $V_2$ and $V_3$ are respectively applied between the rows and column $R_{11}$ in order to excite this part of the screen.

Figure 5:
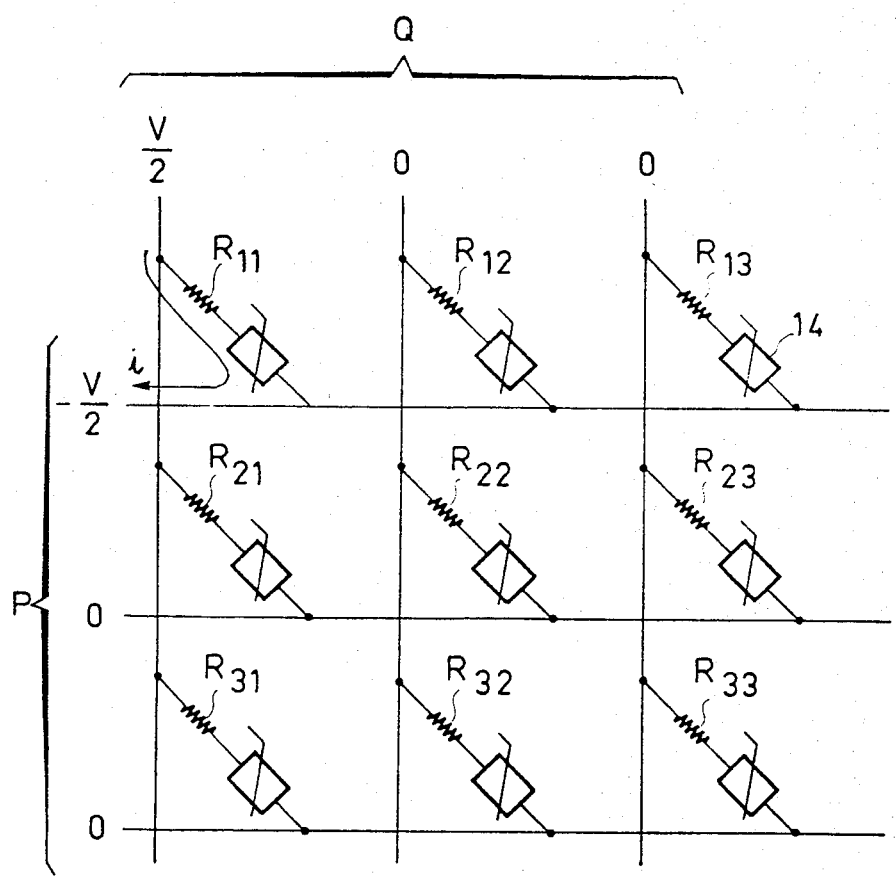
FIG. 5 is a schematic circuit diagram illustrating another embodiment of the multiplexed thermal addressing according to the invention.

It also falls within the scope of the present invention to replace the diodes Dij by varistors and modify the multiplexing voltages supplied by circuits 7 and 8 as a result of this. An example of the distribution of these voltages is given in FIG. 5, which is a diagram explaining the multiplexed thermal addressing. The diagram only shows three multiplexing columns and 3 rows, which is quite sufficient to understand its operation. The heating strips are called Rij as hereinbefore and the varistors are represented by elements 14. The varistors are characterized by a threshold voltage Vs, beyond which they are conductive. As they are bidirectional elements, it is necessary to modify the multiplexing voltages. To bring about the passage of a heating current into $R_{11}$, the first column is at potential $+(V/2)$ and the first row at potential $-(V/2)$, so that the system formed by heating strip $R_{11}$ and the corresponding varistor is exposed to potential V chosen in such a way that it permits the passage of the heating current i able to sufficiently raise the temperature of strip $R_{11}$. It is also necessary for $(V/2)$ to be below the threshold voltage of the varistors in order to prevent the addressing of other heating strips. The other rows and columns shown in FIG. 5 are at potential 0, so that no strip other than $R_{11}$ is traversed by a heating current.

It also falls within the scope of the invention to make the heating elements from a transparent material, in order to use the screen in transmission. In this case, the limited length of the heating strips is made moremarked if the material forming them is more resistive than the aluminium generally used in display devices operating in reflection.

The device described hereinbefore requires a large number of crossings at connections leading to the heating strips. In accordance with a known procedure, insulating layers deposited e.g. by screen process printing must be provided at the locations of these crossings to prevent possible short-circuits.

The system described in this patent application is particularly advantageous when the display matrix has one of its components out of proportion compared with the other. The invention is particularly appropriate for rectangular screens having a large number of columns and a small number of rows, e.g. in the display of alphanumeric characters on one or more rows. In this type of screen, the length of the columns forming the heating elements is limited, e.g. approximately 10 mm.

Thus, the invention permits a much more flexible use than hitherto of the multiplexing of heating strips in a display means. It is particularly advantageous for rectangular screens with a small number of rows and a large number of columns.

What is claimed is:

1. A display device for displaying at least one writing line consisting of characters in response to an incident electric signal, comprising:
   a smectic liquid crystal layer;
   two crossed systems of electrodes provided on opposite sides of said layer;
   electric control means reacting to the content of the incident electric signal to provide current for predetermined periods to selected electrodes of one of said systems so as to establish successive heating and cooling phases in liquid crystal strips adjacent said selected electrodes, and for selectively applying across those of the strips of said layer which are in a cooling phase an electric field to produce a selected optical effect;
   said one of said systems of electrodes being heated comprising N electrodes and said system of electrodes crossed with said one of said systems comprising M electrodes, where $N > M$ to define a rectangular display array, each of said N electrodes connected in series with a respective non-linear resistance element, said N electrodes of said one electrode system being shorter than said M electrodes of the other crossed electrode system; and
   said control means comprising means for selectively applying a first voltage to said M electrodes of said other crossed electrode system to produce said electric field and means for selectively applying a second voltage substantially smaller than said first voltage across opposite ends of selected ones of said N electrodes to implement multiplexing of said two electrode systems on two levels, including a first multiplexing level in which the N electrodes of said one electrode system are multiplexed to produce a heating current through selected of said N electrodes and a second multiplexing level for selectively applying said electric field across selected of said electrodes of said first and second electrode systems.

2. A display device according to claim 1, wherein the non-linear resistance elements are unidirectional conduction elements.

3. A display device according to claim 2, wherein the unidirectional conduction elements are located so as to ensure on average the minimum potential difference between the faces of the liquid crystal layer.

4. A display device according to claim 2, wherein the unidirectional conduction elements are diodes.

* * * * *